United States Patent
Martin et al.

(10) Patent No.: US 12,329,074 B1
(45) Date of Patent: Jun. 17, 2025

(54) WOOD TENSIONING APPARATUS FOR VEGETATION MANAGEMENT EDUCATIONAL TRAINING

(71) Applicants: Chad Martin, Lawton, OK (US);
Richard Watson, Lawton, OK (US)

(72) Inventors: Chad Martin, Lawton, OK (US);
Richard Watson, Lawton, OK (US)

(\*) Notice: Subject to any disclaimer, the term of this patent is extended or adjusted under 35 U.S.C. 154(b) by 330 days.

(21) Appl. No.: 18/103,556

(22) Filed: Jan. 31, 2023

(51) Int. Cl.
*A01G 23/00* (2006.01)
*A01G 23/02* (2006.01)
*G09B 19/24* (2006.01)
*B27B 17/00* (2006.01)

(52) U.S. Cl.
CPC .............. *A01G 23/02* (2013.01); *G09B 19/24* (2013.01); *B27B 17/00* (2013.01)

(58) Field of Classification Search
CPC ........ A01G 23/02; G09B 19/24; B27B 17/00; B27B 17/0075
See application file for complete search history.

(56) References Cited

U.S. PATENT DOCUMENTS

| | | | |
|---|---|---|---|
| 50,601 A | 10/1865 | King | |
| 89,790 A | 5/1869 | Purdy | |
| 112,553 A | 3/1871 | Donner | |
| 119,702 A | 10/1871 | Gustafson | |
| 959,993 A | 5/1910 | Cameron | |
| 4,258,907 A * | 3/1981 | Roberts | B25H 1/00 269/69 |
| 4,362,295 A * | 12/1982 | Ford | B27B 17/0075 269/69 |
| 4,641,822 A * | 2/1987 | Fenerty | B27B 17/0075 269/211 |
| 4,648,778 A * | 3/1987 | Schultz | B66C 5/025 414/23 |
| 4,676,490 A * | 6/1987 | Hopkins | B27B 17/0075 269/53 |
| 5,472,180 A * | 12/1995 | Bent | B27B 17/0075 269/902 |
| 6,322,064 B1 * | 11/2001 | Tallving | B27B 17/0075 269/95 |
| D563,772 S | 3/2008 | Durocher | |
| 8,282,077 B1 * | 10/2012 | Bonney | B66F 3/24 414/23 |
| 9,745,939 B1 * | 8/2017 | Rzepka | F02N 3/04 |

(Continued)

*Primary Examiner* — Omar Flores Sanchez
(74) *Attorney, Agent, or Firm* — Kyle A. Fletcher, Esq.

(57) ABSTRACT

The wood tensioning apparatus for vegetation management educational training is a training device. The wood tensioning apparatus for vegetation management educational training is configured for use with the limb of a tree. The wood tensioning apparatus for vegetation management educational training secures the limb of the tree into a fixed position. The wood tensioning apparatus for vegetation management educational training allows the limb of the tree to be safely cut during training activities. The wood tensioning apparatus for vegetation management educational training incorporates a pedestal structure, a limb platform structure, and a tensioning structure. The limb platform structure and the tensioning structure attach to the pedestal structure. The limb platform structure elevates the limb of the tree above a supporting surface. The tensioning structure secures the limb of the tree into a fixed position.

12 Claims, 5 Drawing Sheets

(56) References Cited

U.S. PATENT DOCUMENTS

| | | | |
|---|---|---|---|
| D863,041 S | 10/2019 | Short | |
| 2010/0186324 A1* | 7/2010 | Staub | G09B 19/24 |
| | | | 52/213 |
| 2014/0021670 A1* | 1/2014 | Geraghty | B25H 1/10 |
| | | | 269/216 |
| 2015/0165638 A1* | 6/2015 | Martin | B27B 17/0075 |
| | | | 269/257 |
| 2023/0039958 A1* | 2/2023 | Thompson | A01K 85/08 |
| 2023/0169885 A1* | 6/2023 | Anzilotti | G09B 19/24 |

* cited by examiner

WOOD TENSIONING APPARATUS FOR VEGETATION MANAGEMENT EDUCATIONAL TRAINING

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention is designed to educate vegetation management groups on the effects of wood under tension.

SUMMARY OF INVENTION

The wood tensioning apparatus for vegetation management educational training is a training device. The wood tensioning apparatus for vegetation management educational training is configured for use with the limb of a tree. The wood tensioning apparatus for vegetation management educational training secures the limb of the tree into a fixed position. The wood tensioning apparatus for vegetation management educational training allows the limb of the tree to be safely cut during training activities. The wood tensioning apparatus for vegetation management educational training comprises a pedestal structure, a limb platform structure, and a tensioning structure. The limb platform structure and the tensioning structure attach to the pedestal structure. The limb platform structure elevates the limb of the tree above a supporting surface. The tensioning structure secures the limb of the tree into a fixed position.

These together with additional objects, features and advantages of the wood tensioning apparatus for vegetation management educational training will be readily apparent to those of ordinary skill in the art upon reading the following detailed description of the presently preferred, but nonetheless illustrative, embodiments when taken in conjunction with the accompanying drawings.

In this respect, before explaining the current embodiments of the wood tensioning apparatus for vegetation management 14 educational training in detail, it is to be understood that the wood tensioning apparatus for vegetation management educational training is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wood tensioning apparatus for vegetation management educational training.

It is therefore important that the claims be regarded as including such equivalent construction insofar as they do not depart from the spirit and scope of the wood tensioning apparatus for vegetation management educational training. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
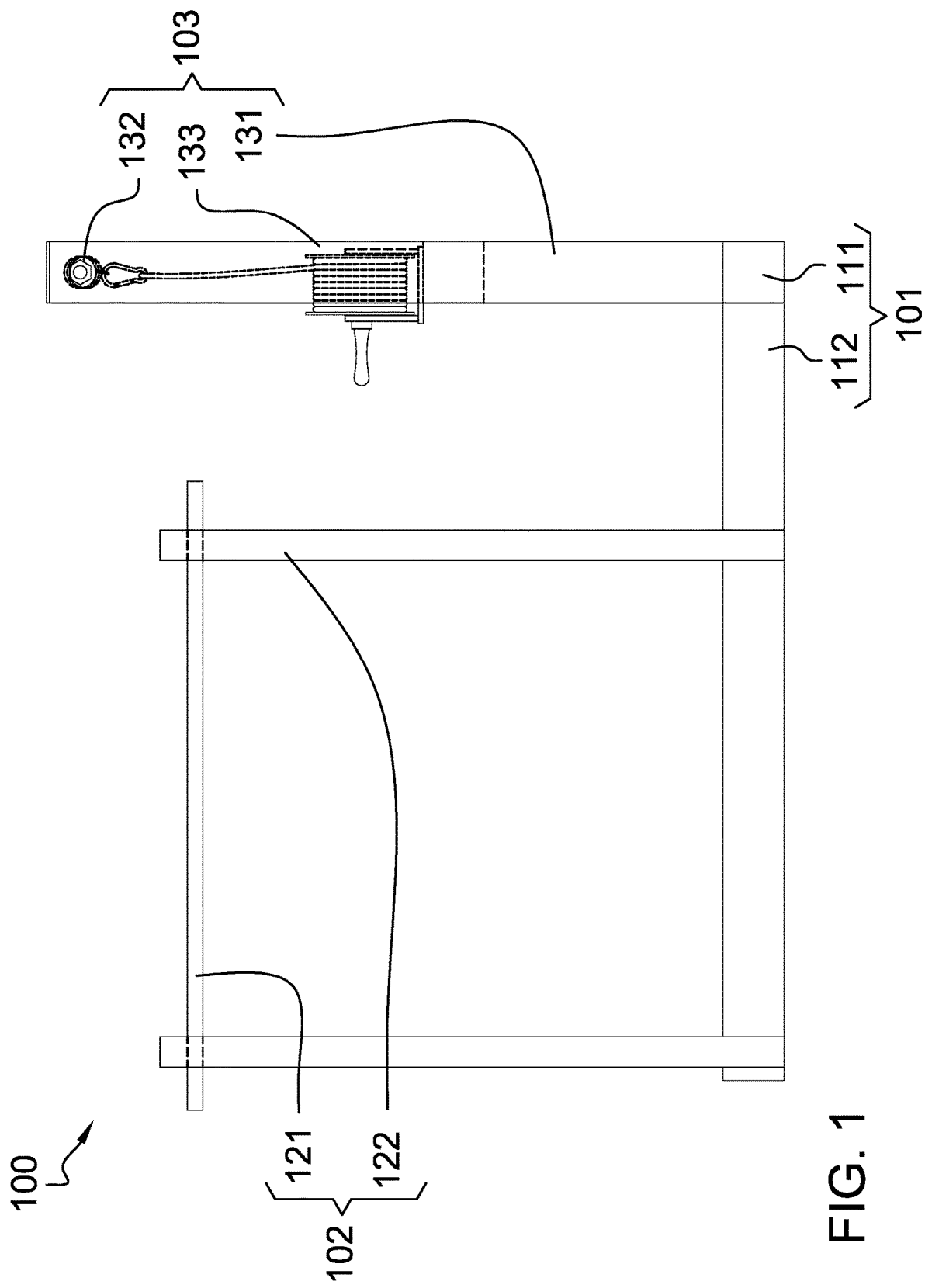
FIG. 1 is a side view of an embodiment of the disclosure.
Figure 2:
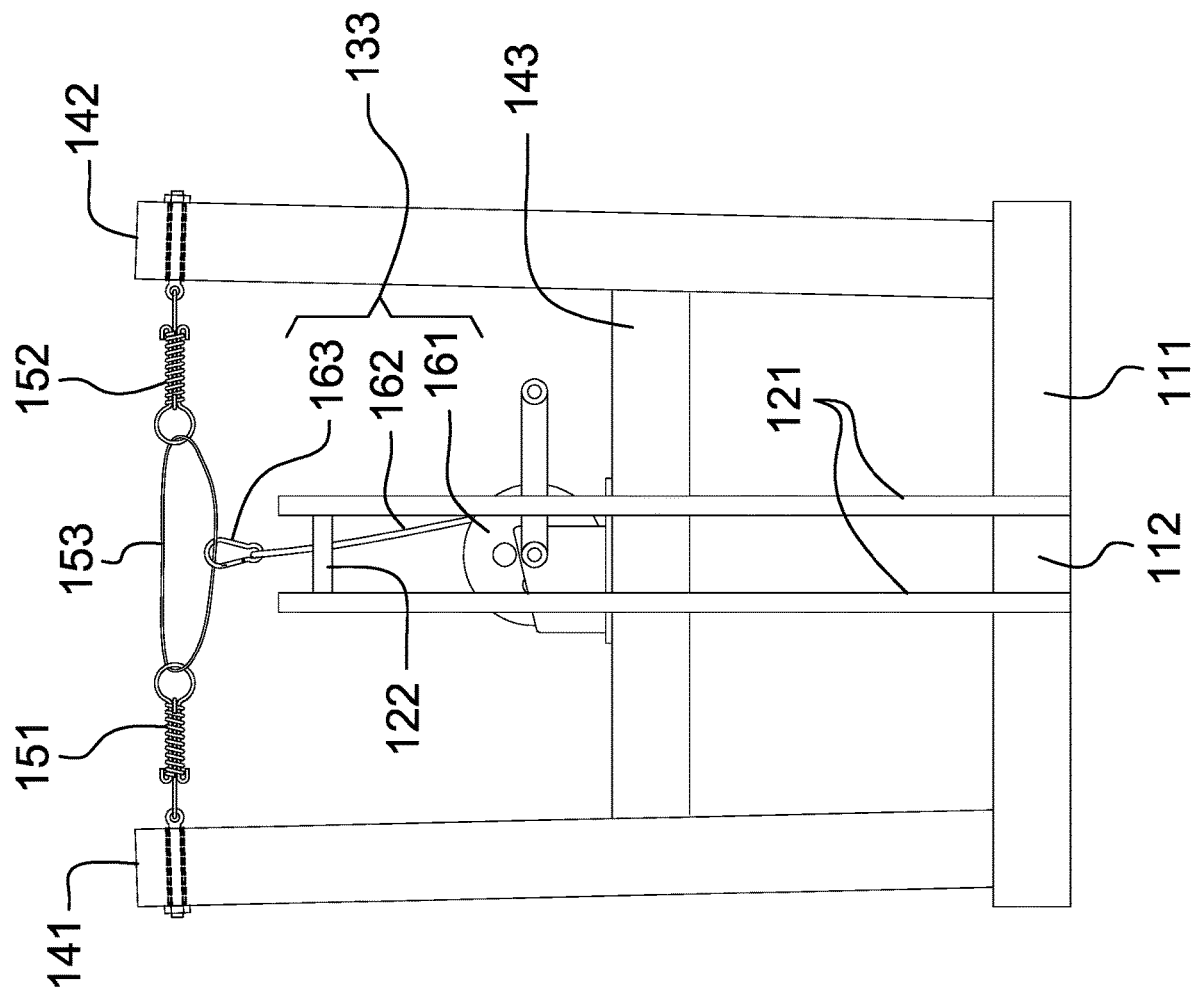
FIG. 2 is a rear view of an embodiment of the disclosure.
Figure 3:
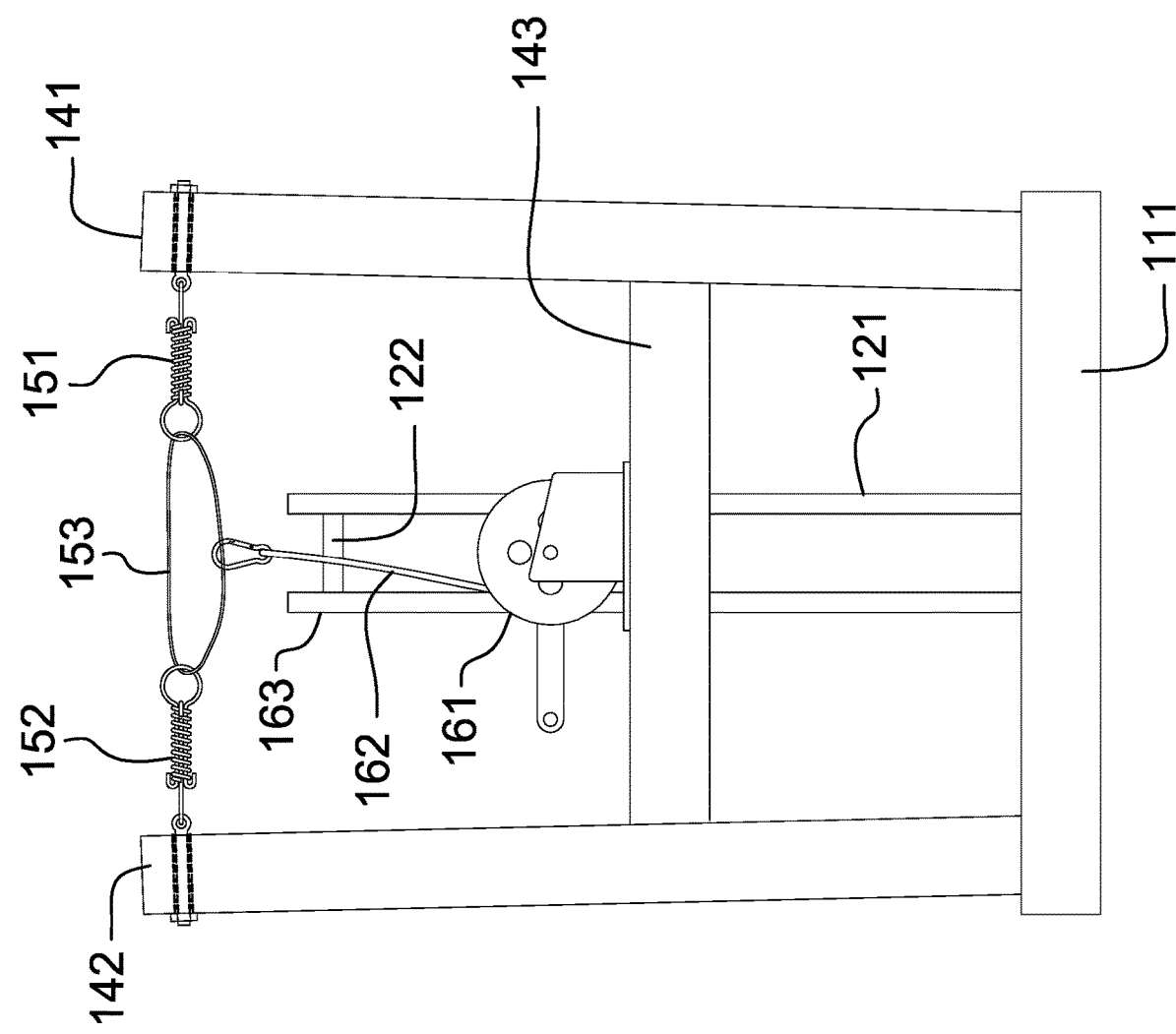
FIG. 3 is a front view of an embodiment of the disclosure.
Figure 4:
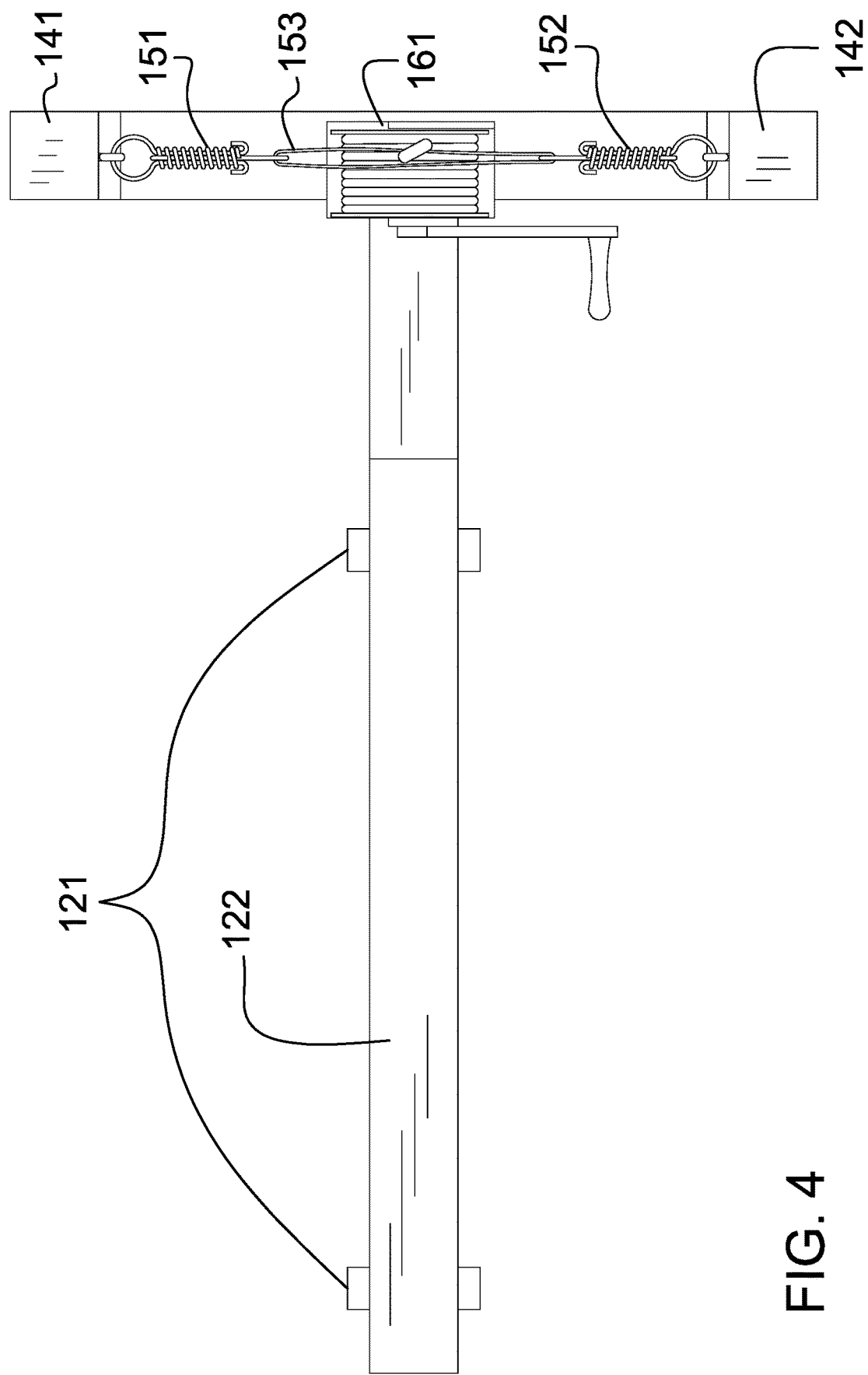
FIG. 4 is a top view of an embodiment of the disclosure.
Figure 5:
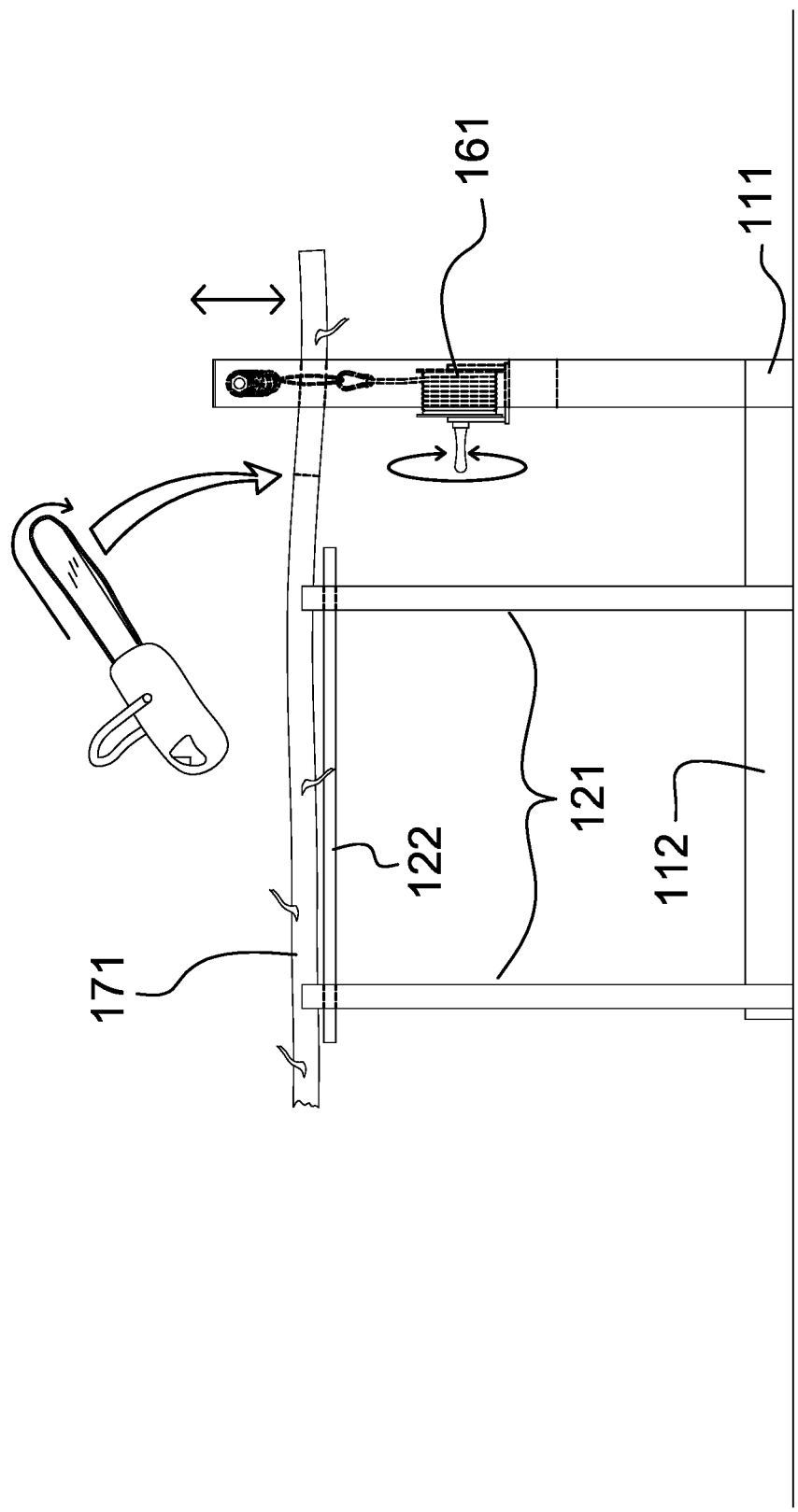
FIG. 5 is an in-use view of an embodiment of the disclosure.

Detailed reference will now be made to one or more potential embodiments of the disclosure, which are illustrated in FIGS. 1 through 5.

The wood tensioning apparatus for vegetation management educational training 100 (hereinafter invention) is a training device. The invention 100 is configured for use with the limb of a tree. The invention 100 secures the limb of the tree 171 into a fixed position. The invention 100 allows the limb of the tree 171 to be safely cut during training activities. The invention 100 comprises a pedestal structure 101, a limb platform structure 102, and a tensioning structure 103. The limb platform structure 102 and the tensioning structure 103 attach to the pedestal structure 101. The limb platform structure 102 elevates the limb of the tree 171 above a supporting surface. The tensioning structure 103 secures the limb of the tree 171 into a fixed position.

The pedestal structure 101 is a load bearing structure. The pedestal structure 101 forms the inferior structure of the invention 100. The pedestal structure 101 forms the structure of the invention 100 that rests on the ground. The limb platform structure 102 and the tensioning structure 103 attach to the pedestal structure 101. The pedestal structure 101 transfers the loads of the limb platform structure 102 and the tensioning structure 103 to the ground. The pedestal structure 101 comprises a tensioning beam 111 and a platform beam 112.

The tensioning beam 111 is a rigid structure. The tensioning beam 111 is a prism shaped structure. The tensioning beam 111 is a load bearing structure. The lateral face of the prism structure of the tensioning beam 111 rests on the ground. The tensioning frame 131 of the tensioning structure 103 attaches to the lateral face of the tensioning beam 111. The tensioning beam 111 forms the load path that transfers the load of the tensioning structure 103 to the ground.

The platform beam 112 is a rigid structure. The platform beam 112 is a prism shaped structure. The platform beam 112 is a load bearing structure. The lateral face of the prism structure of the platform beam 112 rests on the ground. The stanchion structure 121 of the limb platform structure 102 attaches to the lateral face of the platform beam 112. The platform beam 112 forms the load path that transfers the load of the limb platform structure 102 to the ground.

The limb platform structure 102 is a load bearing structure. The limb platform structure 102 is the structure of the invention 100 that receives the limb of the tree 171. The limb platform structure 102 forms a platform that elevates the limb of the tree 171 above the ground. The limb of the tree 171 rests on the superior horizontal surface of the limb platform structure 102. The limb platform structure 102 raises the limb of the tree 171 to an elevation that allows the tensioning structure 103 to secure the limb of the tree 171 into a fixed position relative to the invention 100. The limb platform structure 102 comprises a stanchion structure 121 and a limb support 122.

The stanchion structure 121 is a mechanical structure. The stanchion structure 121 is a load bearing structure. The stanchion structure 121 is a rigid structure. The stanchion structure 121 attaches to the platform beam 112 of the pedestal structure 101. The stanchion structure 121 elevates the limb support 122 and the limb of the tree 171 above the ground. The stanchion structure 121 forms the load path that transfers the loads of the elevated limb support 122 and the limb of the tree 171 to the ground.

The limb support 122 is a disk shaped structure. The limb support 122 is a rigid structure. The limb support 122 is a load bearing structure. The limb support 122 attaches to the stanchion structure 121 such that the limb support 122 forms a horizontally oriented load bearing surface. The limb support 122 attaches to the stanchion structure 121 such that the center axis of the prism structure of the limb support 122 perpendicularly intersects with the center point of the center axis of the prism structure of the stanchion structure 121. The limb support 122 forms the platform that elevates the limb of the tree 171 above the ground.

The tensioning structure 103 is a mechanical structure. The tensioning structure 103 secures the limb of the tree 171 into its fixed position within the invention 100. The tensioning structure 103 holds the limb of the tree 171 in the fixed position such that the limb of the tree 171 can be safely cut. The tensioning structure 103 applies a horizontally oriented tension to the limb of the tree 171 such that the limb of the tree 171 will not shift in the horizontal direction. The tensioning structure 103 applies a vertically oriented tension to the limb of the tree 171 such that the limb of the tree 171 will not shift in the vertical direction. The tensioning structure 103 detaches from the limb of the tree 171 after the limb of the tree 171 has been cut. The tensioning structure 103 comprises a tensioning frame 131, a horizontal tensioning device 132, and a vertical tensioning device 133.

The tensioning frame 131 is a mechanical structure. The tensioning frame 131 is a load bearing structure. The tensioning frame 131 is a rigid structure. The tensioning frame 131 attaches to the tensioning beam 111 of the pedestal structure 101. The tensioning frame 131 elevates the horizontal tensioning device 132 and the vertical tensioning device 133 above the ground. The tensioning frame 131 forms the load path that transfers the loads of the elevated horizontal tensioning device and the vertical tensioning device 133 to the ground. The tensioning frame 131 comprises a first stanchion 141, a second stanchion 142, and a crossbeam 143.

The first stanchion 141 is a prism shaped structure. The first stanchion 141 is a vertically oriented structure. The first stanchion 141 is a rigid structure. The first stanchion 141 is a load bearing structure. The first stanchion 141 permanently attaches to the tensioning beam 111. The first stanchion 141 forms a load path that transfers a portion of the load borne by the horizontal tensioning device 132 of the tensioning structure 103 to the stanchion structure 121.

The second stanchion 142 is a prism shaped structure. The second stanchion 142 is a vertically oriented structure. The second stanchion 142 is a rigid structure. The second stanchion 142 is a load bearing structure. The second stanchion 142 permanently attaches to the tensioning beam 111. The second stanchion 142 forms a load path that transfers the balance of the load borne by the horizontal tensioning device 132 of the tensioning structure 103 to the stanchion structure 121.

The crossbeam 143 is a prism shaped structure. The crossbeam 143 is a vertically oriented structure. The crossbeam 143 is a rigid structure. The crossbeam 143 is a load bearing structure. The crossbeam 143 permanently attaches to the lateral face of the prism structure of the first stanchion 141. The crossbeam 143 permanently attaches to the lateral face of the prism structure of the second stanchion 142. The crossbeam 143 forms a brace that transfers forces between the first stanchion 141 and the second stanchion 142. The crossbeam 143 attaches to the first stanchion 141 such that the center axis of the prism structure of the crossbeam 143 perpendicularly intersects with the center axis of the prism structure of the first stanchion 141. The crossbeam 143 attaches to the second stanchion 142 such that the center axis of the prism structure of the crossbeam 143 perpendicularly intersects with the center axis of the prism structure of the second stanchion 142.

The vertical tensioning device 133 of the tensioning structure 103 mounts on the crossbeam 143. The crossbeam 143 forms a load path that transfers a portion of the load borne by the vertical tensioning device 133 to the first stanchion 141. The crossbeam 143 forms a load path that transfers the balance of the load borne by the vertical tensioning device 133 to the second stanchion 142.

The horizontal tensioning device 132 is a mechanical apparatus. The horizontal tensioning device 132 forms the structure of the tensioning structure 103 that applies the horizontally oriented tension to the limb of the tree 171. The horizontal tensioning device 132 forms a load path that transfers a portion of the horizontally oriented tension applied to the limb of the tree 171 to the first stanchion 141. The horizontal tensioning device 132 forms a load path that transfers the balance of the horizontally oriented tension applied to the limb of the tree 171 to the second stanchion 142. The horizontal tensioning device 132 comprises a first tension device 151, a second tension device 152, and a capture loop 153.

The first tension device 151 is a fastening device. The first tension device 151 attaches the capture loop 153 to the lateral face of the prism structure of the first stanchion 141. The second tension device 152 is a fastening device. The second tension device 152 attaches the second tension device 152 to the lateral face of the prism structure of the first stanchion 141. The first tension device 151 is an adjustable device. The second tension device 152 is an adjustable device. The first tension device 151 adjusts by adjusting the span of the length between the capture loop 153 and the first stanchion 141. The second tension device 152 adjusts by adjusting the span of the length between the capture loop 153 and the second stanchion 142. The first tension device 151 works in conjunction with the second tension device 152 to apply a tension to the capture loop 153.

The capture loop 153 forms a cord. The capture loop 153 is formed as a loop. The capture loop 153 binds the limb of the tree 171 to the first stanchion 141 and the second stanchion 142 of the tensioning frame 131.

The vertical tensioning device 133 is a mechanical apparatus. The vertical tensioning device 133 forms the structure of the tensioning structure 103 that applies the 18 vertically oriented tension to the limb of the tree 171. The 19 vertical tensioning device 133 forms a load path that transfers the vertically oriented tension applied to the limb of the tree 171 to the crossbeam 143. The vertical tensioning device 133 comprises a winch 161, a winch 161 cable 162, and a capture loop 153 carabiner 163.

The winch 161 cable 162 is a cord. The winch 161 cable 162 is stored on the winch 161. The winch 161 cable 162 transfers a load between the capture loop 153 and the winch 161. The winch 161 is a winch 161. The winch 161 is defined elsewhere in this disclosure. The winch 161 retracts the winch 161 cable 162 onto the winch 161. The winch 161 deploys the winch 161 cable 162 from the winch 161. The winch 161 applies a vertically oriented tension to the capture loop 153. The vertically oriented tension applied to the capture loop 153 by the winch 161 through the winch 161 cable 162 is transferred through the capture loop 153 to the limb of the tree 171. The capture loop 153 carabiner 163 is a fastening device. The carabiner is defined elsewhere in this disclosure. The capture loop 153 carabiner 163 removably secures the winch 161 cable 162 to the capture loop 153.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Beam: As used in this disclosure, a beam is a horizontally oriented prism shaped shaft that: 1) is suspended above a supporting surface; and, 2) bears a load.

Bind: As used in this disclosure, to bind is a verb that means to tie or secure a first object to a second object using a strap, cord or webbing. Bind can also mean to tie or secure a plurality of similar first objects together by wrapping a second object around the plurality of similar first objects.

Brace: As used in this disclosure, a brace is a rigid structural element that interconnects a first object with a second object to form a resulting object. The brace forms an energy transfer structure that transfers, distributes, and shares a force acting on the first object between the first object and the second object. The brace is used to support, stabilize, or otherwise steady an object.

Cant: As used in this disclosure, a cant is an angular deviation from one or more reference lines (or planes) such as a vertical line (or plane) or a horizontal line (or plane).

Carabiner: As used in this disclosure, a carabiner is coupling link that is usually formed as an oblong metal ring with one spring hinged side that is used to open and close the ring. Synonyms for carabiner include D-link. A carabiner that has the ability to lock the spring hinged side into a closed position is called a locking carabiner.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord. This definition further includes textile webbings as a type of cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term roughly geometrically similar is meant that the primary shapes of two objects are geometrically similar except that there are functional items (such as fastening devices) associated with the primary shape may not maintain the ratio for geometric similarity.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a fastening device that fixes the position of a first object relative to a second object such that the first object and the second object are subsequently releasable.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between a supporting surface and an object, structure, or other load path.

Perimeter: As used in this disclosure, a perimeter is one or more curved or straight lines that bounds an enclosed area on a plane or surface. The perimeter of a circle is commonly referred to as a circumference.

Plant: As used in this disclosure, a plant is a biological organism: 1) that is not capable of movement over significant distances; and 2) that uses photosynthesis to create nutrients. A stationary biological organism that is not capable of movement over significant distances but does not use photosynthesis is referred to as a parasitic plant. In the vernacular, the term plant will often include parasitic plants. The intention of this disclosure is to include parasitic plants in the definition of plant. As used in this disclosure, the term foliage refers to the leaves and branches of a plant. The structure of the plant where photosynthesis occurs is called the leaf. The trunk of a plant refers to the portion of a plant that forms the biological connections between the roots of the plant and the foliage of the plant. The roots of the plant refer to the biological subsystem of the plant that draws nutrients into the plant through the soil.

Platform: As used in this disclosure, a platform is a raised horizontal surface that forms a load path to support objects placed on the superior surface of the platform.

Primary Shape: As used in this disclosure, the primary shape refers to a description of the rough overall geometric shape of an object that is assembled from multiple components or surfaces.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Pulley: As used in this disclosure a pulley is a wheel with a grooved rim around which a cord (or other form of rope, line, or cable) passes. The pulley is used to change the direction of a force applied to the cord.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tension: As used in this disclosure, tension refers to a force applied to an object such that the force will stretch the span of length of the object along the direction of the force.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Winch: As used in this disclosure, a winch is a device that comprises a cord and a rotating spool. The cord is wound on the spool. The winch is used to move or lift an object by: 1) partially unwinding the cord from the rotating spool; 2) attaching the free end of the cord to the object to be moved or lifted; and, 3) winding the cord back on to the rotating spool in order to move or lift the object.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A wood tension apparatus comprising
a pedestal structure, a limb platform structure, and a tensioning structure;
wherein the limb platform structure and the tensioning structure attach to the pedestal structure;
wherein the wood tension apparatus is configured for use in training how to cut a limb of a tree that is under tension;
wherein the limb platform structure is the structure of the wood tension apparatus that receives the limb of the tree;
wherein the limb platform structure forms a platform that elevates the limb of the tree above the ground;
wherein the limb of the tree rests on a superior horizontal surface of the limb platform structure;
wherein the limb platform structure raises the limb of the tree to an elevation that allows the tensioning structure to secure the limb of the tree into a fixed position relative to the wood tension apparatus.

2. The wood tension apparatus according to claim 1
wherein the wood tension apparatus secures the limb of the tree into a fixed position;
wherein the wood tension apparatus allows the limb of the tree to be safely cut.

3. The wood tension apparatus according to claim 2
wherein the limb platform structure elevates the limb of the tree above a supporting surface;
wherein the tensioning structure secures the limb of the tree into a fixed position.

4. The wood tension apparatus according to claim 3
wherein the pedestal structure is a load bearing structure;
wherein the pedestal structure forms the inferior structure of the wood tension apparatus;
wherein the pedestal structure forms the structure of the wood tension apparatus that rests on the ground;
wherein the limb platform structure and the tensioning structure attach to the pedestal structure;
wherein the pedestal structure transfers the loads of the limb platform structure and the tensioning structure to the ground.

5. The wood tension apparatus according to claim 4
wherein the tensioning structure is a mechanical structure;
wherein the tensioning structure secures the limb of the tree into its fixed position within the wood tension apparatus;
wherein the tensioning structure holds the limb of the tree in the fixed position such that the limb of the tree can be safely cut;
wherein the tensioning structure applies a horizontally oriented tension to the limb of the tree such that the limb of the tree will not shift in the horizontal direction;
wherein the tensioning structure applies a vertically oriented tension to the limb of the tree such that the limb of the tree will not shift in the vertical direction;
wherein the tensioning structure detaches from the limb of the tree after the limb of the tree has been cut.

6. The wood tension apparatus according to claim 5
wherein the pedestal structure comprises a tensioning beam and a platform beam;
wherein the tensioning beam is a rigid structure;
wherein the tensioning beam is a load bearing structure;
wherein the lateral face of the tensioning beam rests on the ground;
wherein the tensioning frame of the tensioning structure attaches to the lateral face of the tensioning beam;
wherein the tensioning beam forms the load path that transfers the load of the tensioning structure to the ground;
wherein the platform beam is a rigid structure;
wherein the platform beam is a load bearing structure;
wherein the lateral face of the platform beam rests on the ground;
wherein the stanchion structure of the limb platform structure attaches to the lateral face of the platform beam;
wherein the platform beam forms the load path that transfers the load of the limb platform structure to the ground.

7. The wood tension apparatus according to claim 6
wherein the limb platform structure comprises a stanchion structure and a limb support;
wherein the stanchion structure is a mechanical structure;
wherein the stanchion structure is a load bearing structure;
wherein the stanchion structure is a rigid structure;
wherein the stanchion structure attaches to the platform beam of the pedestal structure;
wherein the stanchion structure elevates the limb support and the limb of the tree above the ground;
wherein the stanchion structure forms the load path that transfers the loads of the elevated limb support and the limb of the tree to the ground;
wherein the limb support is a disk shaped structure;
wherein the limb support is a rigid structure;
wherein the limb support is a load bearing structure;
wherein the limb support attaches to the stanchion structure such that the limb support forms a horizontally oriented load bearing surface;
wherein the limb support attaches to the stanchion structure such that the center axis of the limb support perpendicularly intersects with the center point of the center axis of the stanchion structure;
wherein the limb support forms the platform that elevates the limb of the tree above the ground.

8. The wood tension apparatus according to claim 7
wherein the tensioning structure comprises a tensioning frame, a horizontal tensioning device, and a vertical tensioning device;
wherein the tensioning frame attaches to the tensioning beam of the pedestal structure;
wherein the horizontal tensioning device forms the structure of the tensioning structure that applies the horizontally oriented tension to the limb of the tree;
wherein the vertical tensioning device forms the structure of the tensioning structure that applies the vertically oriented tension to the limb of the tree.

9. The wood tension apparatus according to claim 8
wherein the tensioning frame is a mechanical structure;
wherein the tensioning frame is a load bearing structure;
wherein the tensioning frame is a rigid structure;
wherein the tensioning frame elevates the horizontal tensioning device and the vertical tensioning device above the ground;
wherein the tensioning frame forms the load path that transfers the loads of the elevated horizontal tensioning device and the vertical tensioning device to the ground.

10. The wood tension apparatus according to claim 9
wherein the tensioning frame comprises a first stanchion, a second stanchion, and a crossbeam;
wherein the first stanchion is a vertically oriented structure;
wherein the first stanchion is a rigid structure;
wherein the first stanchion is a load bearing structure;
wherein the first stanchion permanently attaches to the tensioning beam;
wherein the first stanchion forms a load path that transfers a portion of the load borne by the horizontal tensioning device of the tensioning structure to the stanchion structure;
wherein the second stanchion is a vertically oriented structure;
wherein the second stanchion is a rigid structure;
wherein the second stanchion is a load bearing structure;
wherein the second stanchion permanently attaches to the tensioning beam;
wherein the second stanchion forms a load path that transfers the balance of the load borne by the horizontal tensioning device of the tensioning structure to the stanchion structure;
wherein the crossbeam is a vertically oriented structure;
wherein the crossbeam is a rigid structure;
wherein the crossbeam is a load bearing structure;
wherein the crossbeam permanently attaches to the lateral face of the first stanchion;

wherein the crossbeam permanently attaches to the lateral face of the second stanchion;
wherein the crossbeam forms a brace that transfers forces between the first stanchion and the second stanchion;
wherein the crossbeam attaches to the first stanchion such that the center axis of the crossbeam perpendicularly intersects with the center axis of the first stanchion;
wherein the crossbeam attaches to the second stanchion such that the center axis of the crossbeam perpendicularly intersects with the center axis of the second stanchion;
wherein the vertical tensioning device of the tensioning structure mounts on the crossbeam;
wherein the crossbeam forms a load path that transfers a portion of the load borne by the vertical tensioning device to the first stanchion;
wherein the horizontal tensioning device forms a load path that transfers a portion of the horizontally oriented tension applied to the limb of the tree to the first stanchion;
wherein the horizontal tensioning device forms a load path that transfers the balance of the horizontally oriented tension applied to the limb of the tree to the second stanchion;
wherein the crossbeam forms a load path that transfers the balance of the load borne by the vertical tensioning device to the second stanchion.

11. The wood tension apparatus according to claim 10
wherein the horizontal tensioning device comprises a first tension device, a second tension device, and a capture loop;
wherein the first tension device is a fastening device;
wherein the first tension device attaches the capture loop to the lateral face of the first stanchion;
wherein the second tension device is a fastening device;
wherein the second tension device attaches the second tension device to the lateral face of the first stanchion;
wherein the first tension device is an adjustable device;
wherein the second tension device is an adjustable device;
wherein the first tension device adjusts by adjusting the span of the length between the capture loop and the first stanchion;
wherein the second tension device adjusts by adjusting the span of the length between the capture loop and the second stanchion;
wherein the first tension device works in conjunction with the second tension device to apply a tension to the capture loop;
wherein the capture loop forms a cord;
wherein the capture loop is formed as a loop;
wherein the capture loop binds the limb of the tree to the first stanchion and the second stanchion of the tensioning frame.

12. The wood tension apparatus according to claim 11
wherein the vertical tensioning device comprises a winch, a winch cable, and a capture loop carabiner;
wherein the winch cable is a cord;
wherein the winch cable is stored on the winch;
wherein the winch cable transfers a load between the capture loop and the winch;
wherein the winch is a winch;
wherein the winch retracts the winch cable onto the winch;
wherein the winch deploys the winch cable from the winch;
wherein the winch applies a vertically oriented tension to the capture loop;
wherein the vertically oriented tension applied to the capture loop by the winch through the winch cable is transferred through the capture loop to the limb of the tree;
wherein the capture loop carabiner is a fastening device;
wherein the capture loop carabiner removably secures the winch cable to the capture loop.

* * * * *